US011720112B2

(12) United States Patent
Starr et al.

(10) Patent No.: US 11,720,112 B2
(45) Date of Patent: Aug. 8, 2023

(54) AUTONOMOUS OBJECT RELOCATION ROBOT

(71) Applicant: JAR Scientific LLC, West Mifflin, PA (US)

(72) Inventors: Justin Starr, Baden, PA (US); Ashish Basuray, Petaluma, CA (US); Roman Kazantsev, Fremont, CA (US)

(73) Assignee: JAR Scientific LLC, West Mifflin, PA (US)

( * ) Notice: Subject to any disclaimer, the term of this patent is extended or adjusted under 35 U.S.C. 154(b) by 888 days.

(21) Appl. No.: 16/573,238

(22) Filed: Sep. 17, 2019

(65) Prior Publication Data

US 2021/0080965 A1 Mar. 18, 2021

(51) Int. Cl.
*G05D 1/00* (2006.01)
*G05D 1/02* (2020.01)
*B25J 11/00* (2006.01)
*B25J 9/16* (2006.01)
*B25J 5/00* (2006.01)

(52) U.S. Cl.
CPC ............ *G05D 1/0221* (2013.01); *B25J 9/163* (2013.01); *B25J 9/1682* (2013.01); *B25J 9/1697* (2013.01); *B25J 11/008* (2013.01); *G05D 1/0022* (2013.01); *G05D 1/0027* (2013.01); *G05D 1/027* (2013.01); *B25J 5/005* (2013.01); *B25J 5/007* (2013.01); *G05B 2219/50391* (2013.01)

(58) Field of Classification Search
CPC .. G05D 1/0221; G05D 1/0022; G05D 1/0027; G05D 1/027; G05B 2219/50391; B25J 9/163; B25J 9/1682; B25J 9/1697; B25J 11/008; B25J 5/005; B25J 5/007
USPC ......................................................... 700/213
See application file for complete search history.

(56) References Cited

U.S. PATENT DOCUMENTS

| 10,691,943 | B1* | 6/2020 | Ferstl | B64D 47/08 |
| 11,017,317 | B2* | 5/2021 | Rajkumar | G06N 3/008 |
| 2020/0050206 | A1* | 2/2020 | Deyle | G01S 13/881 |
| 2020/0363815 | A1* | 11/2020 | Mousavian | G06N 3/0454 |
| 2020/0368899 | A1* | 11/2020 | Tellex | B25J 9/042 |
| 2021/0031365 | A1* | 2/2021 | Demirdjian | B25J 9/163 |

OTHER PUBLICATIONS

Stuart H Young & Dilip G Patel "Robotics collaborative technology alliance (RCTA) program overview," Proc. SPIE 10640, Unmanned Systems Technology XX, 106400D (May 3, 2018); doi: 10.1117/12.2314662 (13 pages).

* cited by examiner

*Primary Examiner* — Dalena Tran
(74) *Attorney, Agent, or Firm* — Gabriel & Co; Andrew M. Gabriel (57) ABSTRACT

A self-propelled device is disclosed to recognize objects, possess objects, and transport objects to a new location. A method is disclosed to use the device to transport objects in environments dangerous to humans. Other example embodiments are described and claimed.

8 Claims, 7 Drawing Sheets

AUTONOMOUS OBJECT RELOCATION ROBOT

FIELD OF THE DISCLOSURE

The disclosure relates to systems and methods for autonomous task processing in a physical environment. Specifically, the disclosure is directed to autonomous recognition, possession, and transport of objects.

BACKGROUND OF THE DISCLOSURE

Hazardous work environments pose physical and mental hazards for workers in these professions. Specifically, during or shortly after natural disasters such as tornadoes, hurricanes, flooding, tsunamis, wildfires and earthquakes, or man-made disasters, rescue intervention is required but often hindered by objects, such as debris, refuse and rubble. Likewise, in post-combat theatres, objects, such as debris can hinder advancement, while the environment is still high-risk for human deployment. Other work environments having other types of objects can have high-risk for human deployment, such as underwater, radioactive, or intense heat locations, among others.

Post-natural disaster remediation is typically man-powered, with the use of heavy machinery, such as earth movers, bulldozers, garbage and dump trucks. Significant hazards can pose harm to workers, such as live electrical wires, gas leaks, loose soil/terrain, toxic chemicals in both air and water, bacterial and viral contaminants, etc. In addition, the availability of workers during or post-natural disaster can be scarce and it can be challenging to coordinate synchronized efforts optimally.

Rescue efforts can be further hindered by challenges presented by the landscape. For example, heavy vehicles can encounter non-uniform terrain, heavily damaged road surfaces, fallen trees, boulders, mudslides, and live power lines. Such obstacles would need to be cleared or otherwise overcome in order to facilitate rescue efforts. In an analogous scenario, law enforcement and military vehicles responding to a combat situation routinely engage in a variable range of environments, with non-uniform terrain and hazards including live munitions.

Strategic planning for disaster scenarios prioritizes rescue and recovery. In order to accomplish these tasks, a clear path to specific targets must be made so that wheeled emergency vehicles and other transport can safely arrive. Current human-labor powered technologies and solutions pose undue and significant risk to the workers while providing slow emergency response times. The use of automated, unmanned robotic systems can increase the speed and efficiency of debris clearing efforts by enabling a wider safe operating window via the exclusion of a human operator.

SUMMARY OF THE DISCLOSURE

In an embodiment, an object relocation robot comprises: (a) a self-propelled vehicle, (b) multiple gripper assemblies connected to a track system for lifting objects, (c) a container for storing and transporting objects, (d) a sensor package, and (e) a processor internetworked together with the sensor package; said sensor package comprising one or more of a visual camera, a light detection and ranging (LIDAR) sensor, an acoustic sensor, transducers, and load cells; and said processor comprising a central processing unit and one or more graphics processing units configured to collect visual image data for use in navigation, associate the LIDAR data, visual image data and load cell data to identify objects, optionally with the processor communicating the data over a network connection to coordinate the actions of several self-propelled object relocation robots in the field.

In another embodiment, a method, for identifying objects and choosing a strategy for moving them is identified, comprises the steps of: (a) operating an object relocation robot to obtain sensor data for its surrounding environment; (b) analyzing, using a processor, the sensor data using a trained model, wherein the trained model is trained using a dataset including sensor data of objects and one or more of: visual image data of objects, GPS data, LIDAR point clouds of objects, acoustic data, infrared data, and load cell data indicating elastic modulus and deformation of objects; performing one or more of: identifying, using a processor, a type of object including material properties; selecting, using a processor, a manipulation strategy for lifting or moving the objects effectively; and executing the manipulation strategy to relocate the object.

In another embodiment, a method for identifying surroundings and choosing a path and strategy for locomotion comprises the steps of: (a) operating an object relocation robot to obtain sensor data for its surrounding environment; (b) analyzing, using a processor, the sensor data using a trained model, wherein the trained model is trained using one or more of path planning algorithms, GPS data, LIDAR point clouds; (c) performing one or more of: (1) identifying, using a processor, a type of path for effectively moving to objects for purposes of manipulating or transporting them to other locations for disposal and (2) identifying a locomotion strategy for reaching the objects, constituting of movements involving the tracked or wheeled platform, as well as other physical attachments, such as manipulators or similar devices; and (d) moving the robot using the path and locomotion strategy to possess and transport the object.

The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

DETAILED DESCRIPTION OF THE EMBODIMENTS

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As used in this application, the terms "component," "system," "subsystem," "platform," "controller," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g. screwed or bolted) or removable affixed solid-state storage drives; an object; an executable; a thread of execution; a computer-executable program, and/or a computer.

By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application.

As yet another example, a component can be an apparatus that provides specific functionality through electronic components without mechanical parts, the electronic components can include a processor therein to execute software or firmware that provides at least in part the functionality of the electronic components.

As further yet another example, interface(s) can include input/output (I/O) components as well as associated processor, application, or Application Programming Interface (API) components.

While the foregoing examples are directed to aspects of a component, the exemplified aspects or features also apply to a system, platform, interface, controller, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of modules refers to one or more modules.

The terms "a" or "an', as used herein, are defined as one or more than one. The term plurality, as used herein, is defined as two or more than two. The term "another", as used herein, is defined as at least a second or more. The terms "including" and "having," as used herein, are defined as comprising (i.e., open language). The term "coupled', as used herein, is defined as connected, although not necessarily directly, and not necessarily mechanically.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches also can be used.

The Office of US Foreign Disaster Assistance (OFDA), Center for Research on the Epidemiology of Disasters (CRED) maintains an emergency disaster database called EM-DAT. An event is categorized as a natural disaster if a predetermined number of people are impacted, e.g., displaced or evacuated. An event is also included in the database if a country declares it a natural disaster or if requires the country to make a call for international assistance. According to the EM-DAT, the total natural disasters reported each year has been steadily increasing in recent decades, from 78 in 1970 to 348 in 2004. In the United States, between 1953 and 2011 the population nearly doubled, but natural disasters increased by 756%, or 19× more than was predicted based on population growth. This increase can be in part due to population density and urbanization. Federal, state and local agencies often are resource constrained for rescue and clean-up efforts. A semi-autonomous or fully-autonomous robotic vehicle for rescue and clean-up operations would increase efficiency, prevent unnecessary risk for human operatives, and operate at lower costs.

Rapid and safe deployment are two important factors for rescue and cleanup during or after a natural disaster. Safety for human rescue workers is the primary focus; hence rescue efforts are sometimes delayed until after the scene has been deemed safe for human intervention. This loss of time can result in further injury or loss of life for people within impacted zones. Over the course of one tropical storm or hurricane, billions of tons of debris are created. Search and rescue have primarily been conducted by air, in part, due to the poor condition of the roads and other land-based infrastructure. Cleanup for roads, creating access to hospitals and rescue centers are limited by the safety of the scene and the available resources to clear debris.

Other applications for a semi-autonomous or fully-autonomous object relocation robot would apply to environments where cost of manual labor is inhibitive, for example, large construction or demolition sites generate tons of debris, containing toxic materials. Toxic materials are in many construction materials, for example, asbestos, chromated copper arsenic (CCA) in pressure treated wood, lead, perfluorinated compounds, phthalates, cadmium, silica, fiberglass and short-chain chlorinated paraffins (SCCPs), can pose long-term health risks for workers when exposed over durations of time including cancer, asthma, and pulmonary edema.

Other applications for a semi-autonomous or fully-autonomous object relocation robot would apply to environments are combat, live-munitions, or similar environments. In military scenarios, there is a primary objective, that often creates debris, rubble and other obstacles. Clearing a pathway for further operational support can be dangerous if the environment is still deemed an active theater. An autonomous, or guided object relocation robot would be able to clear debris and create pathways for land movement without endangering human life. Using treads, and the ability to use a sensor package and an algorithm to use tools in the environment enable the robotic vehicle to serve as a search and rescue while clearing debris.

Figure 1:
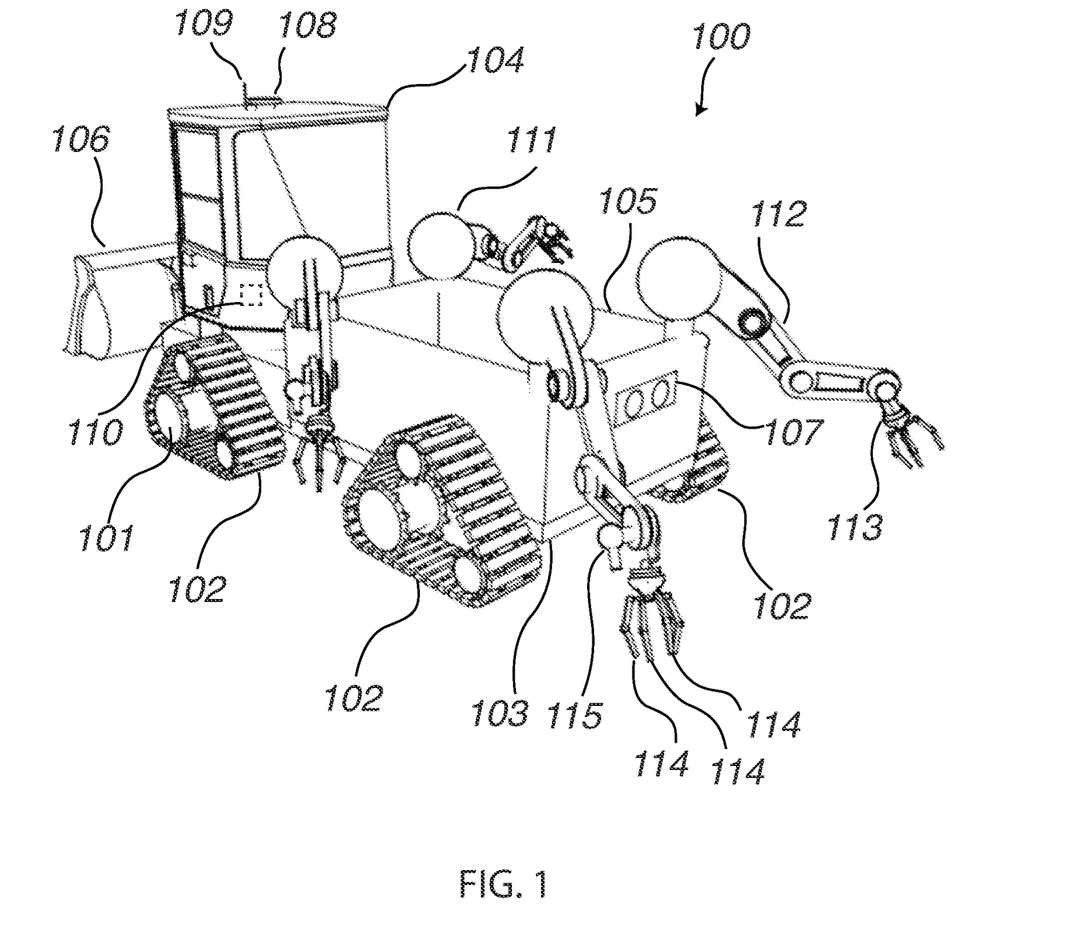
FIG. 1 depicts an example of an autonomous object relocation robot of the disclosure including one or more sensors.

FIG. 1. Illustrates an example autonomous object relocation robot 100. Robot 100 is an integrated system, combining a powered propulsion system 101, a series of treads connected to the propulsion system 102, a chassis 103, a cab 104, a storage bin 105, a pneumatically or hydraulically operated plow 106, a front-mounted sensor package 107, a top-mounted sensor package 108, a communications antenna 109, a processor control module 110, a set of swiveling joints 111, a set of multi-jointed mechanical arms 112, a set of gripper assemblies 113, a set of manipulators 114, and a set of gripper assembly-mounted sensor packages 115. Robot 100 can be a standalone unit, or it can interface with other locally available robot 100 units to divide units of work, collaborate on difficult tasks or add additional information to models of the environment or state. Optionally, storage bin 105 can be equipped to rotate and oscillate in order to pulverize objects and reduce volume therein.

Robot 100 may be embodied with an array of options to customize functionality for a particular task. In an embodiment, tracks of propulsion system 102 provide locomotion. These tracks may be independently addressable, allowing locomotion through synchronized motion or skid steering. A configuration of four tracks is shown in FIG. 1 in order to illustrate a highly redundant configuration. The object relocation robot could operate with as few as two tracks as well as larger multiples to promote navigation through complex environments. Tracks could exist in configurations of even multiples, in which case tracks may be arranged symmetrically around the device. A configuration utilizing an odd number of tracks may include one or more tracks placed under the center of the chassis 103, to achieve goals such as increased ground clearance or lateral stability.

The example illustrated in FIG. 1 uses tracks for locomotion; however other forms of conveyance may be substituted. Tracks may be replaced with a series of wheels in order to perform efficient, long-distance locomotion, such as highway transport between sites. A combination of wheels and treads may be utilized.

The object relocation robot 100 may contain certain hardware elements to facilitate object manipulation, whether in service of the goal of object relocation, or as intermediate or ancillary steps to assist in locomotion. The plow 106 is one example of this functionality. The plow may be electrically or hydraulically driven and actuate up and down in order to enable the robotic 100 to move objects out of the way. Objects are relocated in an attempt to attain an advantageous position for subsequent manipulation, or they are simply be moved out of the way in order to assist in locomotion. The plow 106 may be left in a default down configuration to ensure that objects such as path debris are continuously pushed aside during navigated movement of the robot.

Robot 100 is an automated system, though it may be equipped with provisions for operator control—both in direct and assistive forms. The cab 104 for a supervising driver may optionally be included for this purpose. The cab 104 is a high visibility enclosure, constructed of structural members such as high strength steel alloys, and visible panels composed of a transparent, high strength composite such as LEXAN™ polymer, laminated safety glass or another polymer. An operator inside the cab will be protected from the elements as well as stray debris elements and can observe the setting in order to manually set objectives for the object relocation robot, directly drive the apparatus or fine-tune behavior if results are not as expected. In one example, the system learns from operator inputs in order to refine trained neural network models used for performance.

While the embodiment illustrated in FIG. 1 includes an operator cab 104, an operator is not critical for system functionality. Semi- and fully-autonomous modes of operation are possible. An operator may be removed from the system due to inclement weather or other safety concerns. In the event that an operator is not present, the cab 104 may be repurposed in a number of ways: additional computational hardware can be placed in the cab 104, additional storage of equipment can be included in place of the cab 104, or the cab 104 can be used to shelter a person encountered during the object relocation process, e.g., during a natural disaster.

Most manipulation and possession of objects will take place using the mechanical arms 112 with gripper assemblies 113 that are mounted on swiveling joints 111. These arms 112 have multiple degrees of freedom and may be operated by electronic, hydraulic, or pneumatic drive systems. The example of FIG. 1 depicts arms 112 with four degrees of freedom; however, arms with greater or fewer degrees of freedom may be utilized. Lower cost systems may use simpler arms, while systems requiring more flexibility or a larger vocabulary of object manipulation strategies may use more complex arms. The arms 112 can pivot or swivel and the end effector location may be determined using software routines such as inverse kinematics.

Figure 2:
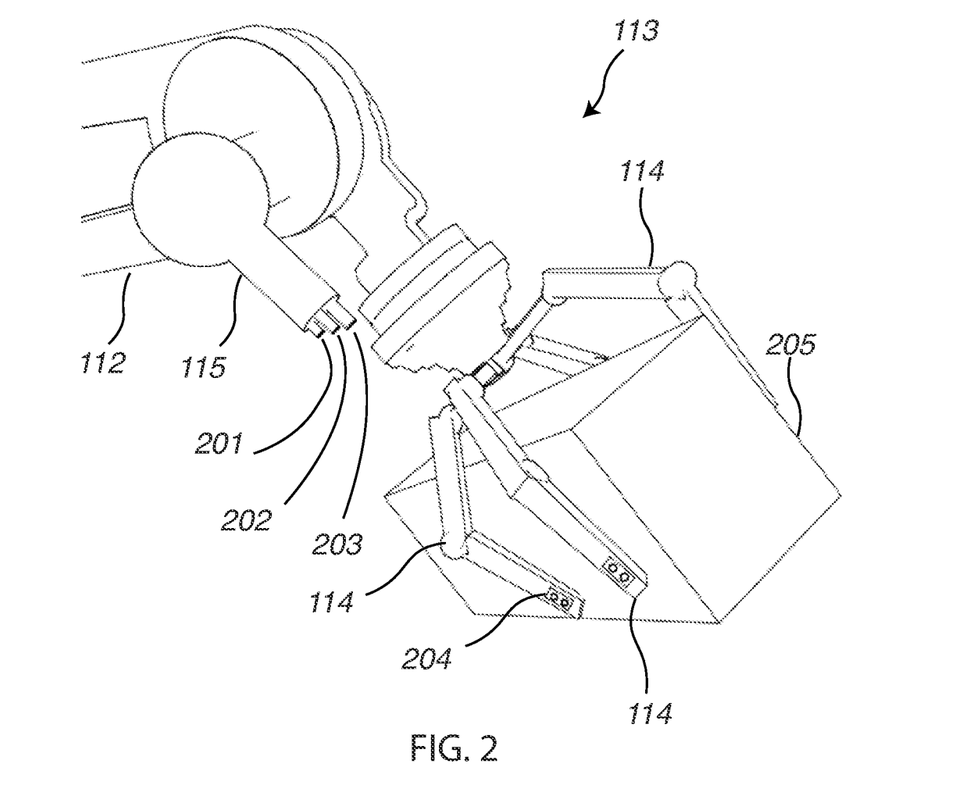
FIG. 2 depicts an example of a manipulator of the autonomous robot and manipulator mounted sensor package.

At arm 112 and manipulator 114 joints, load sensor packages 115 provide force feedback so that the robot 100 is able to determine when resistance to motion is detected. Load cells, each with one or more load sensors 201-204 (as seen in FIG. 2) may be located at one, a few, several, or many joints, depending on the degree of sensitivity required. Force feedback may be used to prevent damage to sensors, but also to serve as a source of data to help effectively classify materials. For example, determining the elastic modulus of a material by using the load cell to calculate a stress-strain plot, yields clues as to the material's composition, and ultimately determine an object relocation strategy.

The robot 100 of FIG. 1 depicts relatively stationary arms 112 that are mounted on swiveling joints 111. However, an embodiment can be formed that allows arms to move around the base of the robotic unit, such as by sliding rails around a track and locking into place.

One or more gripper assemblies 113 work to possess and relocate objects as they are programmed by the on-board algorithms. Objects are deposited into the integrated storage bin 105, or simply moved out of the way for sorting or longer term storage. The integrated storage bin 105 may be equipped with a shredder or compactor (not shown) to reduce the volume of objects being transported. Gripper assemblies act in concert to move debris that cannot be stably moved by a single unit.

FIG. 2. illustrates a detailed view of a single gripper assembly 113 as an example of each gripper assembly. At the end of the gripper assembly 113 is a set of manipulators 114. The gripper assembly 113 is actuated through pneumatic, hydraulic or electric mechanisms, depending on accuracy and speed requirements. Sensors 201, 202, and 203 in load sensor packages 115 on the robotic arms 112 enable fine motor control, determination of arm position, and load sensing. More refined load sensors 204 mounted on the manipulators 114 themselves further assess the object 205 being held in the gripper assembly 113 by multiple manipulators 114 for and during relocation. A detailed description of the sensor hardware and detection algorithms is described in FIGS. 4 and 5, respectively.

Figure 3:
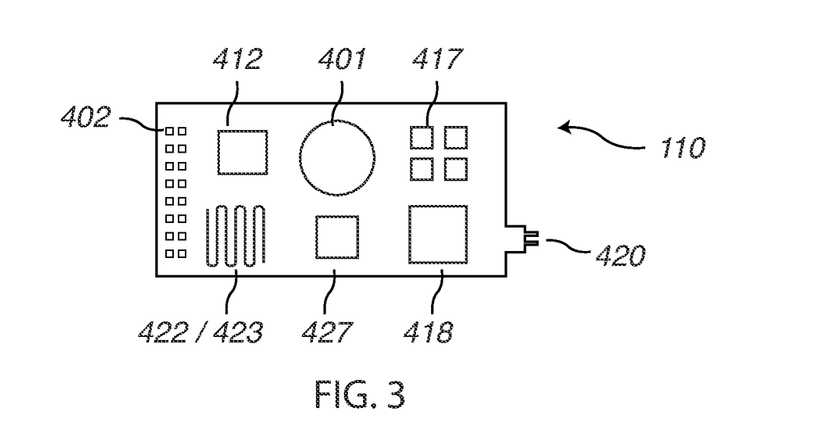
FIG. 3 depicts an example of an autonomous robot's central processor module

The processor control module 110 is diagrammatically illustrated in FIG. 3, and includes the electronic hardware necessary to power the robot, control the robot, and process digital signal to sense the external environment around the robot, as necessary. Control circuit 110 will also have wireless communication equipment necessary for the robot to communicate with an offsite server and/or other robot units in the field. A detailed description of each of the components pictured in FIG. 3 will be provided in the discussion of FIG. 4.

Figure 4:
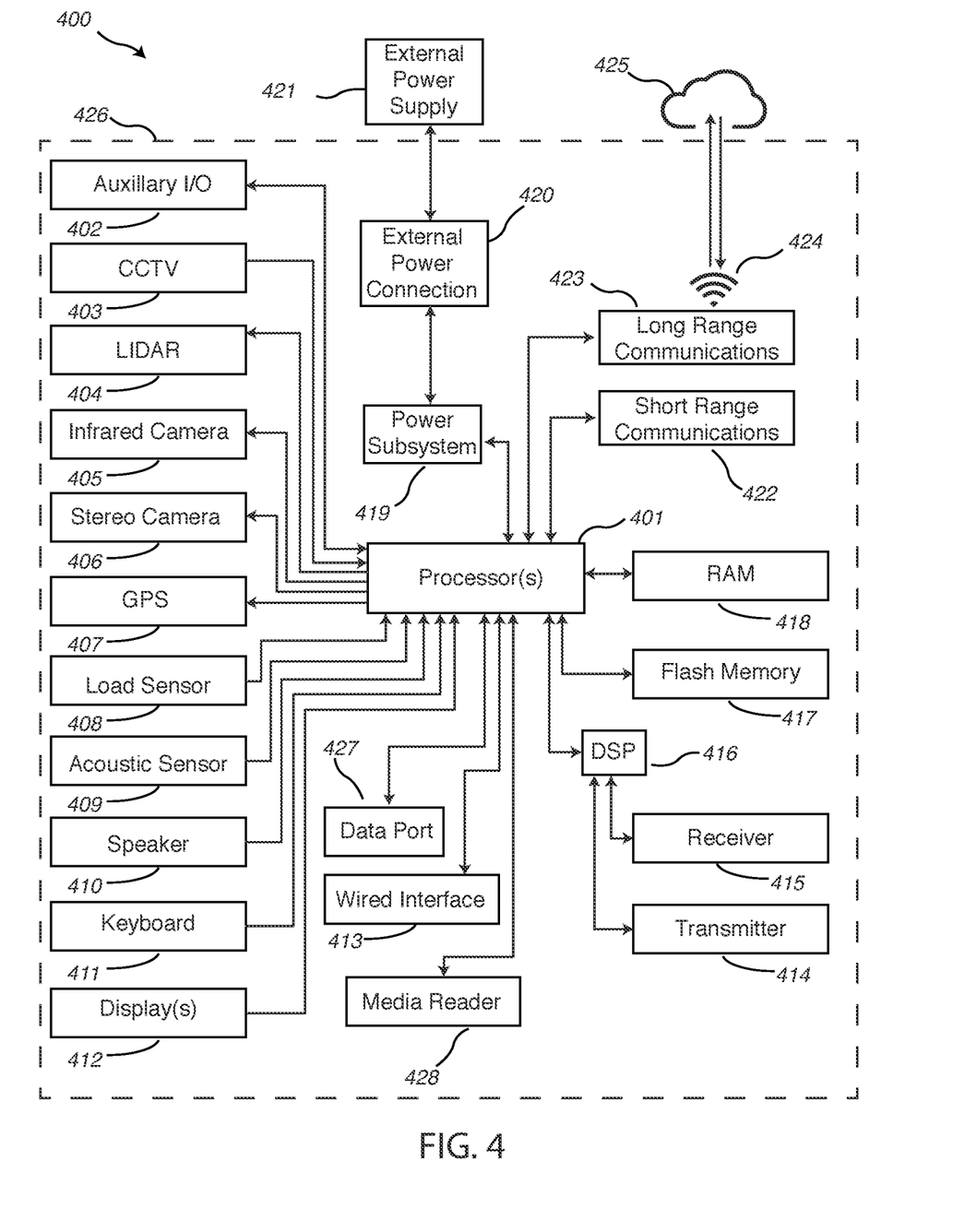
FIG. 4 depicts an example of a circuit flow diagram of processors, sensors, communication, memory, and power subsystems suitable for use in an autonomous robot.

FIG. 4, is a block diagram of an electrical robot control and communications device 400 comprising an external power supply 421, a cloud-based server and memory storage system 425, and an electronic device 426 customized for the use by robot 100. Robot 100 may include one or all of the components of device 426. This includes but is not limited to a processor package 401 comprising at least one central processing unit (CPU) and at least one graphics processing unit (GPU). The device 426 may include one or more of the following components, and there may be one or more of each such component: a series of auxiliary input and output (I/O) ports 402, a CCTV camera 403, a light detection and ranging (LIDAR) sensor 404, an infrared camera 405, a stereo camera 406, a global positioning sensor (GPS) unit 407, a load sensor 408, an acoustic sensor 409, a speaker 410, a keyboard 411, a visual display 412, a wired interface 413, a wireless digital signal transmitter 414, a wireless digital signal receiver 415, a digital signal processing unit 416, a flash memory storage unit 417, a random access memory (RAM) unit 418, a power subsystem unit 419, an external power connection 420, a short-range communication subsystem unit 422, a long-range communication subsystem unit 423, a data port 427, and an external media reader 428. Electronic device 426 is connected powered via an external power supply 421 and interacts with a cloud-based server and memory storage system 425 by sending wireless signals 424 via a long-range communication subsystem unit 423. In this example, an electronic device 426 is processor and sensor package capable of creating a 3D map of robot's 100 location in space. For example, given a task inputted by the user using 402 and 411, robot 100 uses processors 401, on-board sensors 403-409, and wireless communication resources to construct a task list and a map of where to go. More detailed information on how these inputs are integrated is provided in the discussion of FIG. 5.

Referring again to FIG. 3, an example of an electronic circuit board is shown. The processor package 401 occupies a central position, with I/O ports 402, visual display 412, and short/long communication subsystem units 422/423 on the left and flash memory 417, random access memory 418 and external power connection 420 on the right. Other configurations are possible, depending on the requirements of the electronics in the device 426.

Sensors 403-409 located in sensor packages at the front 107 and top 108 of robot 100, as well as gripper assembly mounted sensor packages 115 and integrated throughout the robot provide information about the surrounding environment by sending digital signals to GPU/CPU processor package 401 via DSP unit 416. Communication systems 422-423 enable the robot to interact via device 426, with both direct controllers, an autonomous, cloud-based swarm of other components within device 426 as shown in FIG. 4, or other assets capable of radio communication. Sensors identified in FIG. 4 and otherwise may include spinning LIDAR, closed-circuit television cameras, stereo cameras, infrared cameras, tilt sensors, temperature and humidity sensors, gyroscopes and IMUs, magnetometers, and other devices. The embodiment seen in FIG. 1 shows a sensor package localized in a few discrete places, but sensors may be distributed in a larger number of locations throughout the robot in order to optimize performance.

Sensors are connected to the larger robotic system via a well-defined high-speed network. Electronic device 426 incorporates communication subsystem elements such as a wireless transmitter 414, a wireless receiver 415, and associated components such as one or more short and long range communication antenna elements 422 and 423, respectively. A digital signal processor (DSP) 416 performs processing to extract data from received wireless signals and to generate signals to be transmitted. The particular design of the communication subsystem is dependent upon the communication network and associated wireless communications protocols with which the device is intended to operate. Examples of suitable communication systems include Wi-Fi, Zigbee, 3G/4G/5G cellular, Satellite, shortwave radio, and the like. Software defined radios allow the robot to dynamically alter radio communications systems depending on regulatory and operational needs in a specific environment.

The electronic device 426 includes a CPU/GPU processor package 401 (as well as other processing units such as graphics processing units GPUs) that controls the overall operation of the electronic device 426. The processor 401 interacts with the above described communications subsystem elements and also interacts with other device subsystems such as flash memory 417, random access memory (RAM) 418, auxiliary input/ output (I/O) device 402, speaker 410, keyboard 411, display(s) 412, a power subsystem 419, and any other device subsystems.

A power subsystem 419 provides power to the circuits of the electronic device 426. Processor and sensor state data is stored in non-volatile flash memory 417, so no battery power storage is required to preserve state information. The power subsystem is connected to an external power connection 420, which is fed electrical power from an external power supply 421.

The data port 427 is an interface across which electrical and optical data communications are sent to or received from electrical device 426. The data port 427 supports data communications between the electronic device 426 and other devices through various modes of data communications, such as high speed data transfers over an optical communications circuits or over electrical data communications circuits such as a universal serial bus (USB). Data communication through data port 427 enables a user to set preferences through an external device or through a software application and extends the capabilities of the device by enabling information or software exchange through direct connections between the electronic device 426 and external data sources rather than via a wireless data communication network.

Operating system software used by the microprocessor 401 is stored in flash memory 417. The operating system software, device application software, or parts thereof, are temporarily loaded into volatile data storage such as RAM 418. Data received via wireless communication signals or through wired communications are stored to RAM 418.

The processors 401, in addition to its operating system functions, execute software applications on the electronic device 426. A predetermined set of applications that control basic device operations, including at least path finding, object detection, object manipulation, and communication with external resources, are installed on the electronic device 426 during manufacture or at another time. Examples of applications that are loaded onto the device are related object detection of specific items, traversing specific terrain, or communication with specific information systems. Optionally, tilt sensors or gyroscope are used to obtain data quantifying the stability of the specific terrain.

Further applications may also be loaded onto the electronic device 426 through, for example, the short- or long-range communication systems 422 and 423, respectively, an auxiliary I/O device 402, data port 427, or any combination of these interfaces. Such applications are then able to be installed by a user in the RAM 418 or a non-volatile store for execution by the microprocessor 401.

In a data communication mode, a received signal such as user instructions or data from an external resource is processed by the communication subsystem, including wireless receiver 415 and wireless transmitter 414, and communicated data is provided the CPU/GPU processor package 401. The processor package is then able to further process the received data for output to the display 404, or alternatively, to an auxiliary I/O device 402 or the data port 427. A user of electronic device 426 may also compose data items, such as instructions for robot 100, using the keyboard 411, e.g., a complete alpha numeric keyboard or a telephone-type keypad, in conjunction with the display 412 and possibly an auxiliary I/O device 402. Such composed items are then transmitted over a communication network through the communication subsystem.

For voice communications, received signals are picked up by acoustic sensor 409 and interpreted by the processors 401. Signals for transmission are produced by a speaker 410. Alternative voice or audio I/O subsystems, such as a voice message recording subsystem, may also be implemented on the electronic device 426. Although voice or audio signal output is accomplished primarily through speaker 410, display 412 provides an indication of the message being communicated, such as a mission status update, time to completion, or internal system status update, for example.

In an embodiment, depending on conditions or statuses of the electronic device 426, one or more particular functions associated with a subsystem circuit are disabled, or an entire subsystem circuit is disabled. For example, if the system operating temperature is too low or too high for safe processor operation, then non-critical functionality such as voice functions are disabled, but data communications, such as wireless or long-range communication, are still be enabled over the communication subsystem.

A short-range communications subsystem 422 provides for data communication between the electronic device 426 and different systems or devices, which need not necessarily be similar devices. For example, the short-range communications subsystem 422 includes an infrared device and associated circuits and components or a radio frequency-based communication module such as one supporting BLUETOOTH™ communications, to provide for communication with similarly-enabled systems and devices, including the data file transfer communications described above. A wired interface 413 is provided and configured to support any known wired communication protocol, for example USB.

A media reader 428 is connected to an auxiliary I/O device 402 to allow, for example, loading computer readable program code of a computer program product into the electronic device 426 for storage into flash memory 417. One example of a media reader 428 is an optical drive such as a CD/DVD drive, which is used to store data to and read data from a computer readable medium or storage product such as computer readable storage media. Examples of suitable computer readable storage media include optical storage media such as a CD or DVD, magnetic media, or any other suitable data storage device. Media reader 428 is alternatively connected to the electronic device through the data port 427 or computer readable program code is alternatively provided to the electronic device 426 through the cloud-based network 425.

Figure 5:
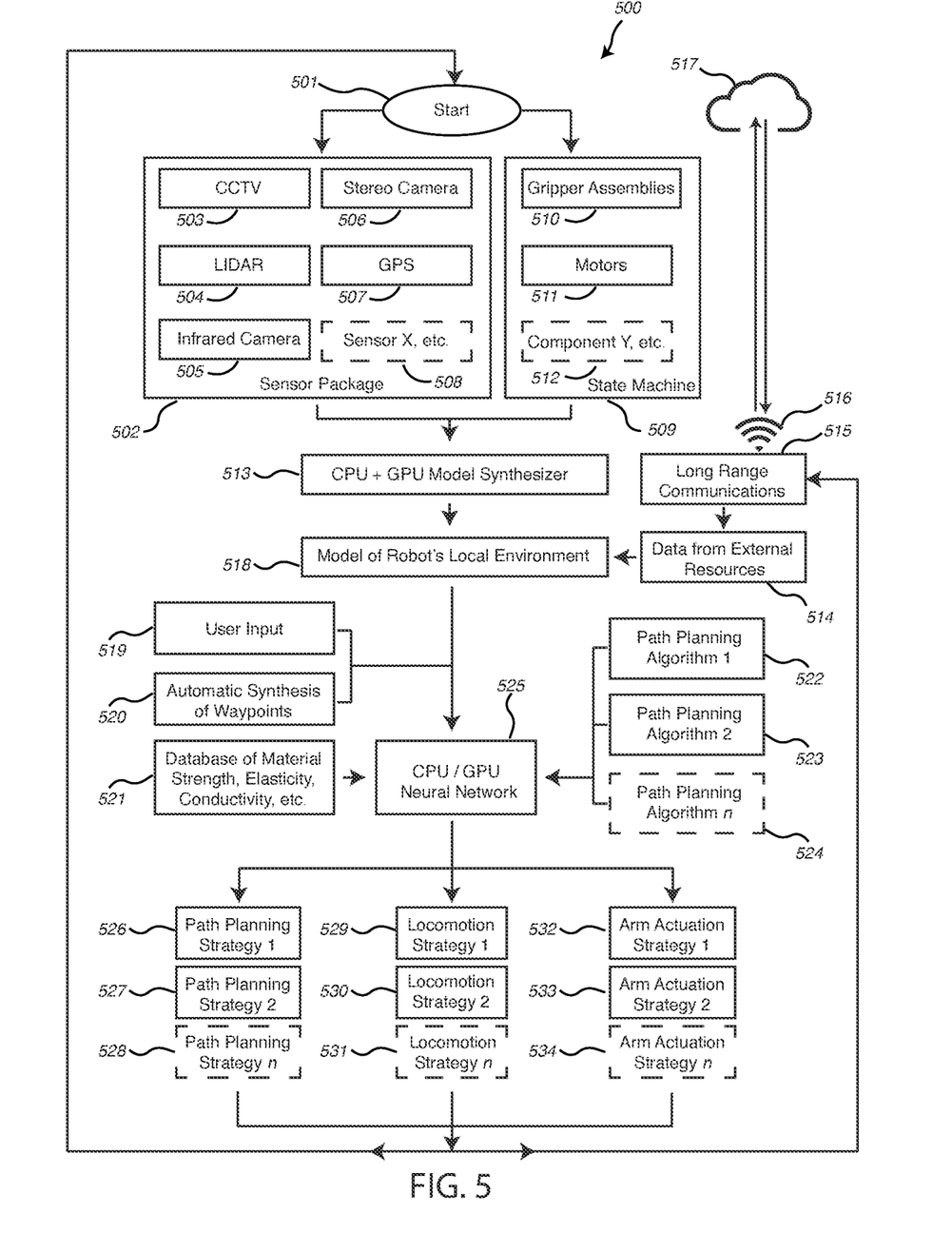
FIG. 5 depicts an example method for autonomous object recognition, path planning, object manipulation, and communication with external resources.

FIG. 5 outlines process 500 for the vehicle to use the signal outputs from electronic device 426 to develop a strategy to execute path planning, locomotion and arm actuation. What follows is a discussion of one iteration through process cycle 500. 501 indicates the starting point for the process for autonomous object relocation. Data obtained from the sensor package 502, machine state 509 and external data 518 creates a virtual model 518 of the current local environment of the robot 100. To do this, several data sources are sent to the CPU/GPU processor package 401 hardware and combined in the model synthesizing package software 513. These data sources include digital signals from the sensor package 502, comprised of the digital signal output of CCTV camera 503, LIDAR 504, infrared camera 505, stereo camera 506, GPS 507, and the output from sensor X and other sensors not listed 508, and digital signals from the current machine state 509 of robot 100, comprised of the current state of the gripper assemblies 510, motors 511, and the signal output from the current state of component Y and other components not listed 512.

Upon receiving these signal inputs, software package 513 works to create a model 518 of the robot's current environment. This model 518 is further augmented by the inclusion of a dataset received from external resources 514. This dataset 514 is retrieved from a cloud-based software package 517 for organizing motions and task of robots in the field via wireless signal 516 sent by long-range communication subsystem 515. Dataset 514 instructs model 518 of robot's 100 position both proximally and in regard to the current mission status relative to other robot 100 units in the field.

Upon creation of model 518, the on-board software package combines a set of user inputs 519, a set of automatically synthesized waypoint(s) 520, and a database of material properties 521 and feeds them into CPU/GPU based neural network 525. Neural network 525 then develops a series of path planning 526-528, locomotion 529-531, and arm actuation 532-534 strategies.

Examples of user input could include direct input via on-board controls in cab 104 such as keyboard 411 and acoustic sensor 409 for voice commands, or human remote-controlled directional inputs through radio, wireless Internet, BLUETOOTH™ or data networks like 3G, 4G, 5G. User input 519 may also include communication with other autonomous robots to work collectively on a target or assignment Examples of material properties include material strength, material elasticity, material conductivity, material shimmer, etc. These material properties are used in conjunction with sensor package data 502 for object identification. For example, if the material being viewed has a high spectral reflectance, and is conductive when touched by the robotic arm, the neural network identifies the material as a metal, which enables the robotic arm to press firmly on the material with minimal load-sensor feedback loops to ensure the material is not cracked or crushed. Conversely, if the output from the neural network 525 indicates the material is likely soft or has a low density, for example, tumbleweeds, or drywall, the robotic manipulators adjust feedback rates to prevent crushing or severing of material before disposal or removal.

Examples of automatic synthesis of waypoints 520 include identification of roads or road markings. If the primary objective for the robot is to clear a path for first responders, the process prioritizes clearing the center of the lane to allow for wheeled vehicles to pass without obstruction. Alternatively, in military theater, the path planning process identifies structures or objects of interest and develop a series of waypoints to clear a path and enable ground movement or line of sight to target. Optionally, a human operator can set macro waypoints, and the process 500 chooses the optimal route for navigating to the waypoints.

As a result of the neural network calculations, a series of n path planning processes 522-524, where n can be at least 1, desirably at least 10, and preferably at least 25, is then fed into neural network to generate n path planning strategies 526-528, n locomotion strategies 529-531, and n arm actuation strategies 532-534, where n can be at least 1, at least 10, or at least 25. For example, in a natural disaster scenario, if removal of a tree branch in the middle of the road is a key objective, the neural network identifies any other hazards between the robot and the tree branch, determines the shortest path and outputs a series of vectors representing speed and direction to arrive at the tree branch. The neural network produces a dynamically created decision tree useful for the robot operations.

The result of running process 500 through one cycle generates the next path planning, locomotion, and arm actuation action of robot 100. These aggregated data are updated to cloud-based software package 517 via wireless signal 516 sent by long-range communication subsystem 515. Process 500 then repeats the cycle to further inform the autonomous action of robot 100.

The sensor package is customizable based on the specific function of the autonomous object relocation vehicle. If the goal of the vehicle is to clear a pathway for first responders during search and rescue, sensors such as mid-range infrared detect heat signatures of mammals and other warm-blooded organisms and process appropriate functions such as sending a radio or GPS communication to search and rescue operations. Additionally, infrared sensors relay information through radio communication to rescue operators, for example, from uncontrolled fires or other aberrant heat signatures.

By way of example, and referring to FIG. 5, a robot placed in the vicinity of a disaster may obtain sensor data of its surroundings 502. It could collect CCTV imagery of objects 503 and apply edge detection to classify shapes. Coloration analysis of red, green and blue (RGB) values may suggest a surface quality or material type. GPS location 507 can be compared to reference data to determine elevation and topography of the environment. The robot can then synthesize these data points to develop a model of the surrounding environment, such as facing a fallen tree, or the remnants of a destroyed house, etc.

Simultaneously, the robot can survey its internal state 509. Position of the joints 510, 511 could be obtained by reading data from the servos used in positioning. This information could take the form of coordinates, voltages, sector information expressed in binary coded decimal, or degrees of rotation. Data for each joint and the manipulator can be combined to create an accurate model of the robot's state at a moment in time, such as indicating that all joints are in the home or reference position, and the tracks are not in motion. This internal state and environmental data are coupled via a synthesizer 513 to form a detailed model of the local environment 518. This model can be broadcast on a network and be compared or integrated with models sent out by other devices 514, both to include the devices in the model, and to add depth and fidelity from additional perspectives.

The process repeats, e.g., continuously, such that an accurate model of the surroundings is maintained, and the robot will possess a near-real time copy of this information when it is given commands by a user or an autonomous process.

For example, the robot could be directed to move a distant piece of rubble. The user could drive the robot to the rubble and give the robot manual commands to move the rubble as in teleoperation 519. Alternatively, the user (or an autonomous process) could identify the coordinates of the rubble and the robot would need to determine the best path for getting to the correct location and disposing of the rubble. The robot could automatically synthesize waypoints 520 and a path to the rubble by relying on a neural network to generate a custom approach using a neutral network 525, which could be an off-the-shelf product such as TensorFlow, or a customized deep convolutional neural network. The result would be a ranked list of path planning and locomotion strategies 526-531 that the robot could use to reach its destination. Once there, a similar process would be used to select an arm actuation strategy 532-534 using environmental observations and reference data on material properties 521. Once selected, the strategy is applied to enable the robot to actually move the debris.

Figure 6:
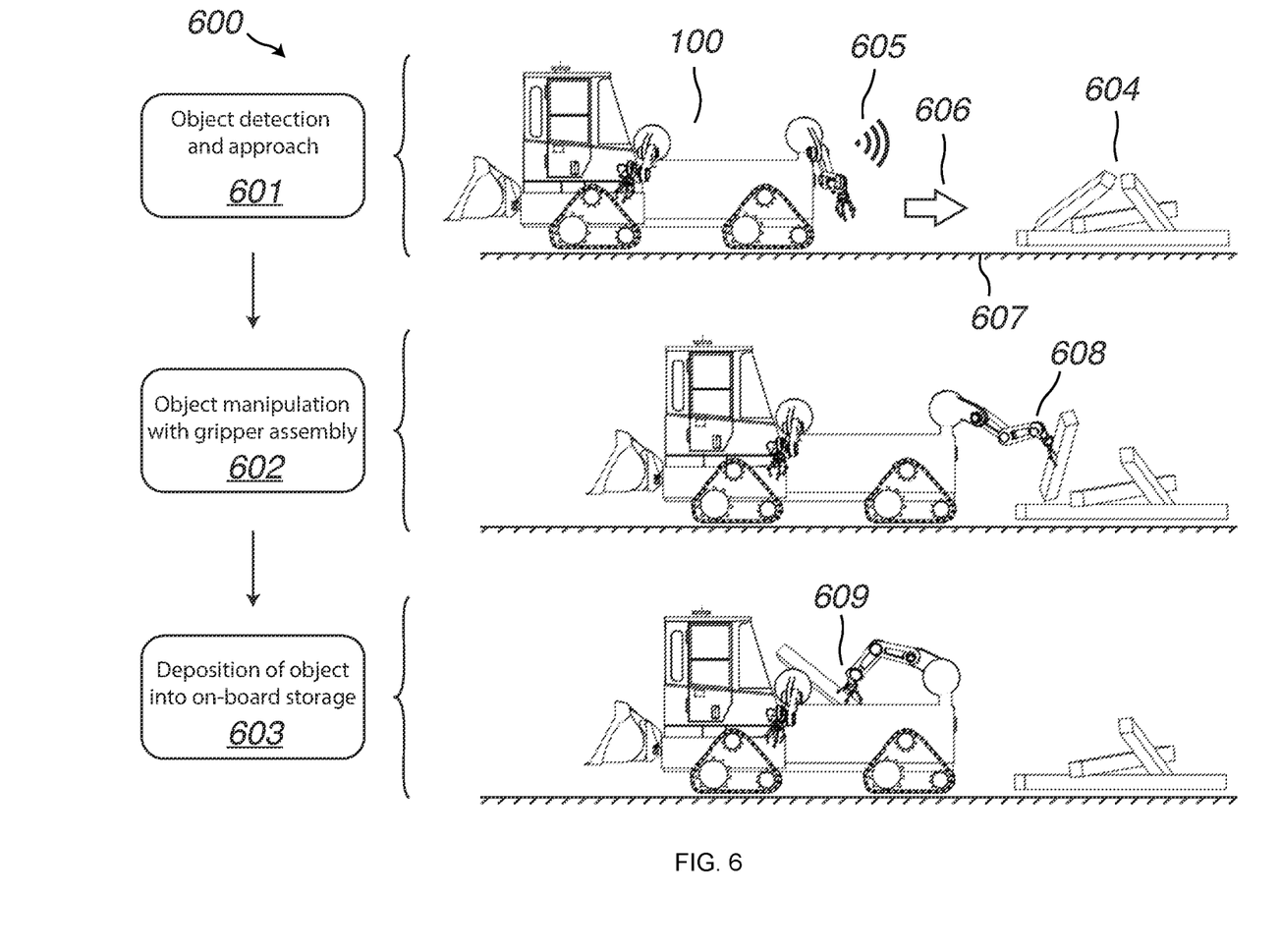
FIG. 6 depicts examples of an autonomous robot detecting, possessing, and transporting objects.

FIG. 6 shows an example of the object relocation robot in operation in a simplified scenario. Strategy 600 combines hardware and software for object recognition, possession, and relocation. In looped software process 601, robot 100, autonomously or as directed by an operator, scans the environment and recognizes object 604 using process 500 (not shown). In some cases, the objects are noted and added to the robot's internal model of the scene. These cases involve instances when the robot is tasked with navigating in the local environment, but not in the vicinity of the object. They are still noted and added to the model.

In this embodiment, the robot has been tasked with interacting with the objects. If the robot is tasked with manipulating object 604, it uses the sensor package via signal 605 to clearly calculate the distance between the robot and the objects, as well as identify any obstacles in the way, and plan a path for navigating to the objects. The robot then actuates the treads or conveyance system to move across hard surface 607 along path 606 in order to close the gap between the unit and object 604. The entire time the robot is in motion, the sensor package via signal 605 is scanning the scene and providing updated information via process 500.

When the robot closes the gap and is within range of object 604, it then begins a process 602 wherein it uses its gripper assemblies in action 608 to probe the object for characteristics that can aid in possession or relocation. The robot can attempt to lift the object in order to determine its mass. The robot can also push or squeeze the object and use the robot's force feedback system to determine the elastic modulus of the object. The robot combines this information from other sources such as the sensor package or preprogrammed mapping. For example, CCTV systems return information about the coloration of the object; LIDAR units provide a point cloud of shape, and GPS mapping indicates materials that are likely to be at this location. By way of specific example, if the robot is in an area where a lumberyard is known to exist, it can be informed of a high likelihood of encountering pine boards.

Once the robot has determined what the object is likely to consist of, it then begins the process 603 of choosing a manipulation strategy and either relocates the object to a predetermined location, or loads the object into the bin for conveyance offsite. Optionally, the manipulation strategy automatically chooses which manipulator is the nearest identified object. The strategy the robot chooses depends on the identification of material properties in the previous process 602. This identification of material property may be performed through the fusion of one or more streams of sensor data. Visual characteristics may be combined with a magnetic measurement in order to identify iron or steel. Compression and elastic modulus of an object being grasped may be combined with real time point cloud data in order to identify softer materials like vegetation. Once the material properties of the object are determined, the robot will select an appropriate manipulation strategy. For example, if objects are determined to be consisted of iron or steel, the robot can employ an electromagnet or a hook to aid in lifting. If objects are comprised of fiberglass insulation, the robot will extensively compress the objects to ensure it is lifted. In the illustrated example of FIG. 6, the robot loads the debris into on-board storage 609 where it can be transported to a separate location. The on-board storage may or may not compress or compact the debris, depending on configuration.

The object relocation robot may repeat these processes 601-603 until it has completed its object relocation task. This cycle of detection, manipulation or relocation may also be interrupted manually, and an operator may prioritize certain types or locations of debris for removal. After each use of each robot, strategies 601-603 contribute to the assembly of data and use of techniques known as machine learning result in additional trained models for any robot similarly equipped.

Figure 7:
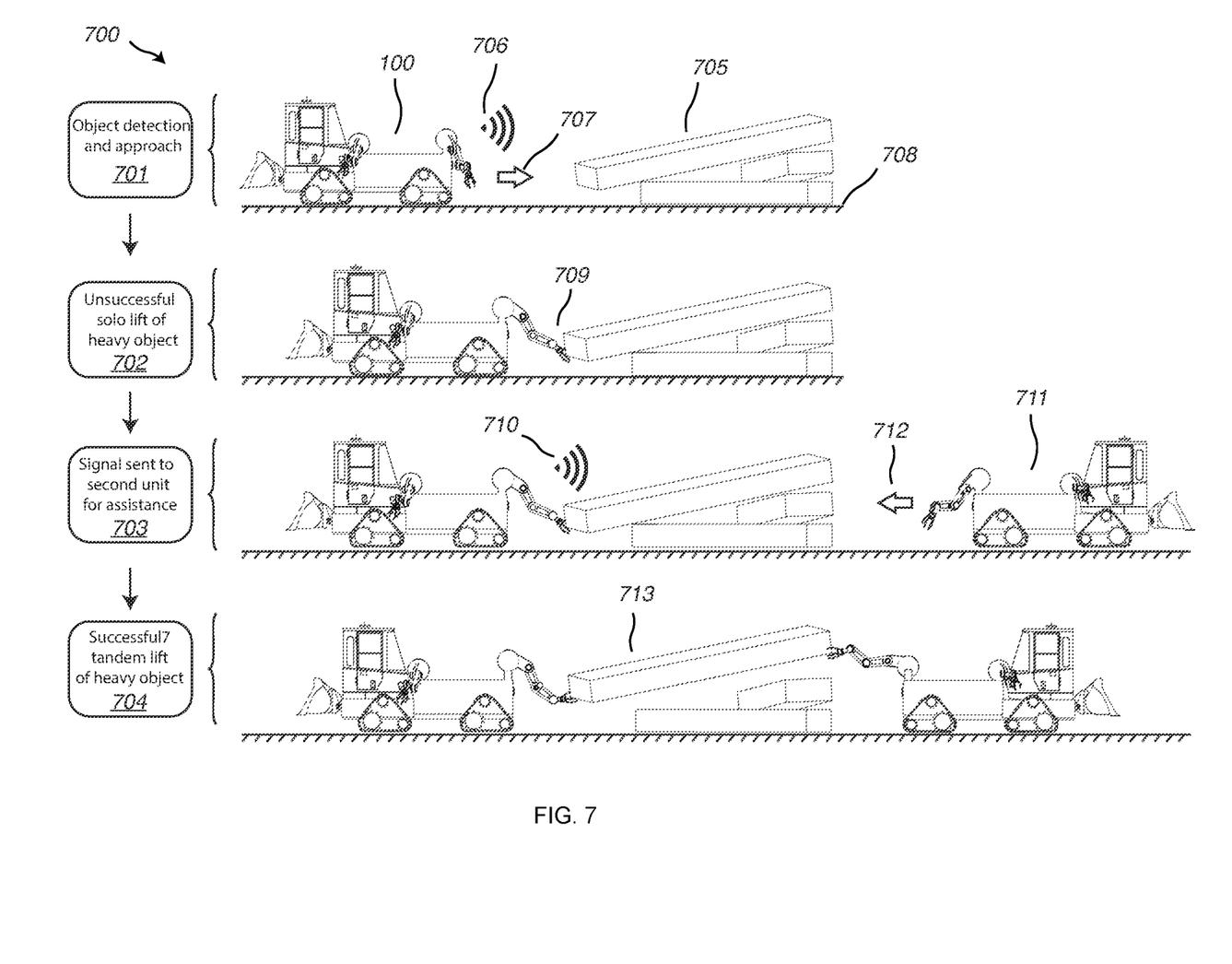
FIG. 7 depicts an example of a group of autonomous robots using short-range communication to relocate a large or cumbersome object.

FIG. 7 illustrates an example of a cooperative object relocation strategy 700 using multiple units of robot 100. Similar to the object relocation approach described in FIG. 6, robot 100 uses sensors in 403-409 and process 500 for object detection 706, implements path planning 707 to move to object 705 along surface 708, and determines the optimal object relocation strategy. After implementing this strategy 701, robot 100 attempts to lift or manipulate debris 705.

There can be situations where the solo lift strategy 709 calculated by the software loop of 702 proves to be unsuccessful because the debris is either too heavy, too large or otherwise cumbersome, or some other situation that prevents a solo lift strategy from occurring. If the solo lifting strategy is prevented, robot 100 alters the chosen strategy from process 500 to reflect the new available data about debris 707. In software implementation 703, robot 100 send signals 710 to other robot 100 units in the field via long-range communication software package 515 to cloud-based software package 517 that additional assistance is required. Cloud-based software package 517 then relays the message to a second robot 100 unit in the field. The newly recruited robot 100 unit 711 then proceeds along path 712 calculated by execution of process 500 to the waypoint of interest marked by robot 100. Upon arrival to object 705, robot 100 and 711 work together via short-range communication subsystem 422 to execute a tandem lifting strategy 704 to lift object 705 in a manner that would be inaccessible to an individual robot 100 unit. For example, such a tandem lifting strategy 704 resulting in relocation 713 of object 705 is applicable to debris collection or is applicable at construction sites to lift heavy materials such as pipes, work equipment, and concrete blocks, or at lumber yards for lifting pallets of lumber or tools. After each use of robot(s), strategies 701-704 join strategies 601-603 in the assembly of data and use of techniques known as machine learning result in additional trained models for any robot similarly equipped.

Figure 8:
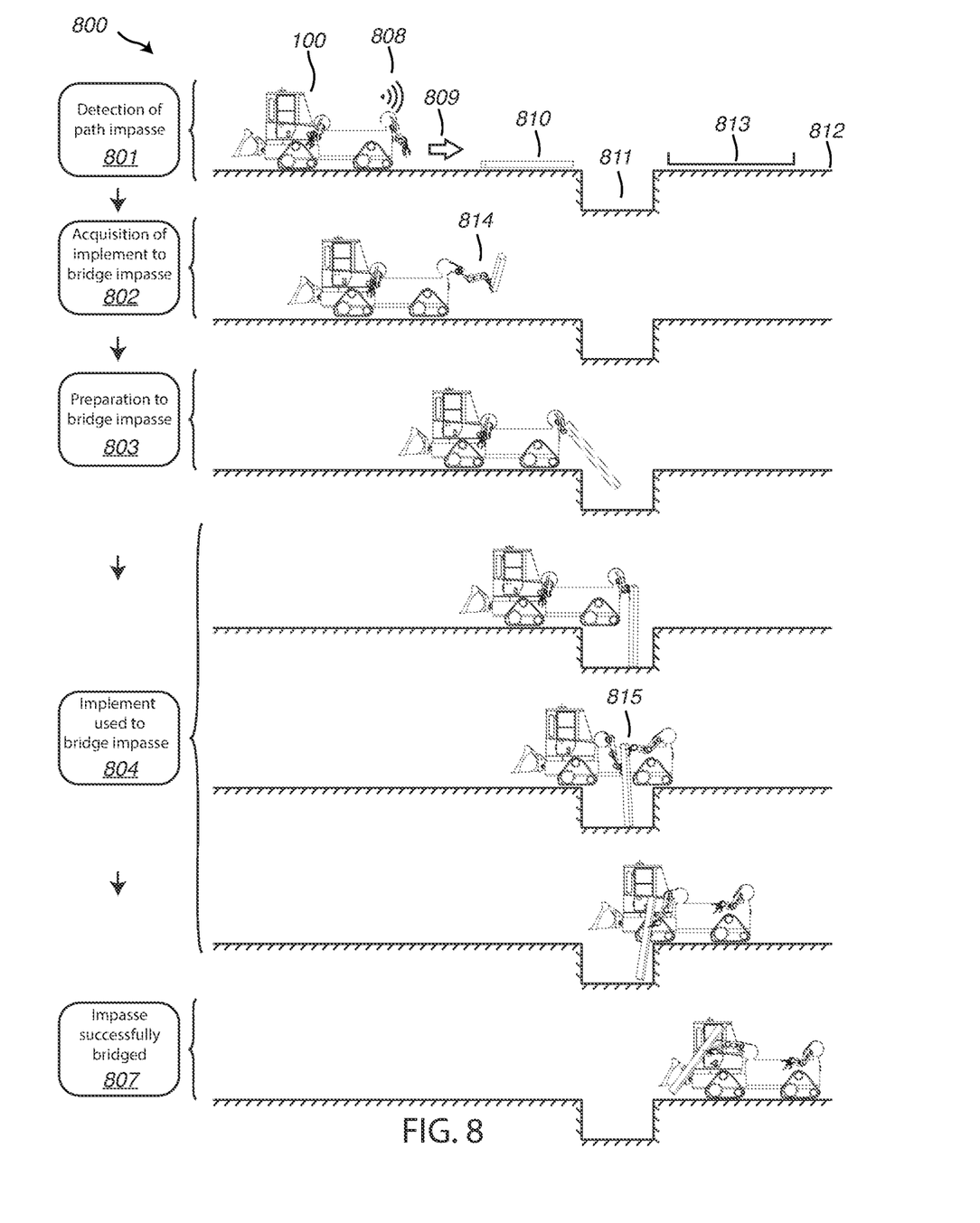
FIG. 8 depicts an example of an autonomous robot traversing impassable terrain via the assistance of tool found in the environment.

FIG. 8 describes strategy 800 for robot 100 to acquire an implement to bridge a physical impasse over a distance to accomplish a locomotion-based task. In software loop 801, robot 100, having been given a task, attempts to reach location 813 along hard surface 812. Using process 500, robot 100 scans the environment 808 and determines one or more obstructions 810, 811 in its path block its chosen path 809. Robot 100 then alters its output strategy from process 500 with this newly available data and begins to scan for implement 810 to assist in crossing impasse 811. The distance to destination 813 is calculated as well as the distance between the impasse 811 and the destination 813.

Provided there is ample space for the robot to leverage an implement 814 to cross the physical impasse 811 by utilization of the implement, the robot runs software loop 802 to acquire object 810 with one or more gripper assemblies. The robot will use process 500 to determine arm actuation strategies 532-534 to pick up object 810 and use it to create implement 814 and determine if such use of implement 814 is feasible to safely bridge the impasse. Neural network 525 will use software loop 803 to determine if the probability of crossing the impasse by use of implement 814 is feasible. If the calculated strategy is feasible the robot will then use software loop 804 and implement 814 at an angle and gripping strategy that will result in the highest likelihood of bridging the impasse.

While using the implement 814 to bridge an impasse, the real time neural network 525 will determine if corrective action is required to increase the probability of successful usage of implement 814. This can result in the use 815 of a proximity oriented empty manipulator arm to support or reposition the implement to provide additional stability and additional propulsion. Through the additional manipulation of the implement 814, the implement can be repositioned through the process of passing the impasse in order to provide stability or maximize the probability of successfully crossing the impasse. Once the impasse has been successfully bridged using strategy 807, the implement 814 is discarded, placed in on-board storage, or held by the manipulator for further use with additional impasses. Optionally, a manipulator is extended by grasping objects to form more flexible systems for conveyance of the robot. After each use of robot(s), strategies 801-804 join strategies 601-603 and 701-704 in the assembly of data and use of techniques known as machine learning result in additional trained models for any robot similarly equipped.

it will be readily understood that certain embodiments can be implemented using any of a wide variety of devices or combinations of devices, examples of which are described herein. It should be noted that the various functions described herein may be implemented using instructions stored on a memory, e.g., memory 418, that are transmitted to and executed by a processor, e.g., processor 401. Device 426 includes one or more storage devices that store programs and other data. A storage device, as used herein, is a non-transitory storage medium. Some examples of a non-transitory storage device or medium include, but are not limited to, storage integral to device 426, such as a memory 418 or a solid-state drive, and removable storage, such as an SD card or a memory stick.

Program code stored in a memory or storage device may be transmitted using any appropriate transmission medium, including but not limited to wireless, wireline, optical fiber cable, RF, or any suitable combination of the foregoing.

Program code for carrying out operations may be written in any combination of one or more programming languages. The program code may execute entirely on a single device, partly on a single device, as a stand-alone software package, partly on a device and partly on another device, or entirely on another device. In an embodiment, program code may be stored in a non-transitory storage medium and executed by a processor to implement any of the functions or acts specified herein.

Example embodiments are described herein with reference to the figures, which illustrate example methods, devices and program products according to various example embodiments. It will be understood that the actions and functionality may be implemented at least in part by program instructions. These program instructions (computer code) may be provided to a processor of a device to produce a special purpose machine, such that the instructions, which execute via a processor of the device, implement the functions/acts specified.

It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining, using an object relocation robot, data comprising sensor data for an environment surrounding an object to be relocated;
   analyzing, using a processor, the sensor data using a trained model to identify a type of the object and select a manipulation strategy for moving the object;
   identifying, using a processor, a material property of the object; and
   executing the manipulation strategy to relocate the object;
   wherein the manipulation strategy comprises a preset goal; and
   wherein the material property of the object and the preset goal are used to form the manipulation strategy.

2. The method of claim 1, wherein the manipulation strategy automatically chooses one of a plurality of manipulators of the object relocation robot.

3. The method of claim 2, wherein the manipulation strategy includes using more than one manipulator jointly to move the object.

4. The method of claim 1, wherein the sensor data is added to a database comprising one or more of image data, representative point cloud data, elastic moduli, and deformation characteristics.

5. The method of claim 1, wherein the sensor data comprises one or more of acoustic and infrared data; and wherein the one or more of acoustic and infrared data is compared to a threshold indicating a warm-blooded organism is present.

6. The method of claim 5, wherein the processor combines the one or more of acoustic and infrared data with GPS coordinates to output a location.

7. The method of claim 1, wherein the manipulation strategy comprises a path to the object.

8. The method of claim 1, wherein the manipulation strategy comprises a plan to use an additional object or objects to perform a task related to the object.

* * * * *